(12) United States Patent
Helton

(10) Patent No.: US 9,889,429 B2
(45) Date of Patent: Feb. 13, 2018

(54) HYDROGEN PRODUCTION CATALYSTS AND ASSOCIATED SYSTEMS AND METHODS

(71) Applicant: Bill W. Helton, Pleasant Grove, UT (US)

(72) Inventor: Bill W. Helton, Pleasant Grove, UT (US)

(73) Assignee: Bill W. Helton, Pleasant Grove, UT (US)

( * ) Notice: Subject to any disclaimer, the term of this patent is extended or adjusted under 35 U.S.C. 154(b) by 0 days.

(21) Appl. No.: 14/436,436

(22) PCT Filed: Oct. 16, 2013

(86) PCT No.: PCT/US2013/065286
§ 371 (c)(1),
(2) Date: Apr. 16, 2015

(87) PCT Pub. No.: WO2014/062833
PCT Pub. Date: Apr. 24, 2014

(65) Prior Publication Data
US 2016/0059214 A1    Mar. 3, 2016

Related U.S. Application Data

(60) Provisional application No. 61/714,561, filed on Oct. 16, 2012.

(51) Int. Cl.
*C01B 3/26* (2006.01)
*B01J 23/04* (2006.01)
(Continued)

(52) U.S. Cl.
CPC ............... *B01J 23/04* (2013.01); *C01B 3/08* (2013.01); *H01M 4/8652* (2013.01); *H01M 4/9041* (2013.01); *Y02E 60/36* (2013.01)

(58) Field of Classification Search
CPC .. B01J 23/04; B01J 16/00; B01J 2208/00752; B01J 8/003; B01J 7/02;
(Continued)

(56) References Cited

U.S. PATENT DOCUMENTS

| 4,165,339 A | 8/1979 | Reichle |
| 4,847,225 A | 7/1989 | Lussier |
| 6,638,493 B2 * | 10/2003 | Andersen ................... B01J 7/02 423/627 |
| 7,001,866 B2 | 2/2006 | Wang |

(Continued)

FOREIGN PATENT DOCUMENTS

| DE | 102010006881 A1 * | 8/2011 | ............... C10G 3/44 |
| GB | 798712 | 7/1958 | |

(Continued)

OTHER PUBLICATIONS

Mahmoodi et al. "Enhancement of hydrogen generation rate in reaction of aluminum with water", 2010, Internation Journal of Hydrogen Energy, vol. 35, issue 11, p. 5227-5232.*

*Primary Examiner* — Anthony J Zimmer
*Assistant Examiner* — Syed Iqbal
(74) *Attorney, Agent, or Firm* — Thorpe North & Western, LLP

(57) ABSTRACT

An alkaline catalyst for hydrogen generation can comprise a first metal (102), a second metal (104), and hydroxide (104). When the alkaline catalyst is added to an aqueous solution containing a hydrogen generation metal, the aqueous solution produces at least 4 L of hydrogen per 5 gram of hydrogen generation metal per 15 minutes at a production temperature of 140° F. and at a pressure of 1 atm.

10 Claims, 2 Drawing Sheets

(51) Int. Cl.
   *C01B 3/08*   (2006.01)
   *H01M 4/86*   (2006.01)
   *H01M 4/90*   (2006.01)

(58) Field of Classification Search
   CPC .. B01J 2208/00778; C01B 3/08; Y02E 60/36;
                              C01F 7/428; H01M 8/065
   See application file for complete search history.

(56) References Cited

U.S. PATENT DOCUMENTS

| | | |
|---|---|---|
| 7,105,468 B2 | 9/2006 | LaBarge et al. |
| 7,247,598 B2 | 7/2007 | Duan |
| 7,691,527 B2 | 4/2010 | Petillo et al. |
| 8,071,242 B2 | 12/2011 | Rosenfeld et al. |
| 8,080,343 B2 * | 12/2011 | Jang ................... C01B 3/0031 |
| | | 429/416 |
| 8,088,708 B2 | 1/2012 | Takatsu et al. |
| 2003/0118505 A1 | 6/2003 | Andersen |
| 2007/0003475 A1 | 1/2007 | Lim et al. |
| 2007/0021299 A1 | 1/2007 | Takehira et al. |
| 2008/0044692 A1 | 2/2008 | Reetz |
| 2010/0173225 A1 | 7/2010 | Rosenband |
| 2011/0274615 A1 | 11/2011 | Ishikawa |

FOREIGN PATENT DOCUMENTS

| | | |
|---|---|---|
| JP | 2000-169101 A | 6/2000 |
| JP | 2004-223415 A | 8/2004 |
| KR | 2008-0046545 | 5/2008 |
| WO | WO 02-08118 A1 | 1/2002 |
| WO | WO 2011-124189 A2 | 10/2011 |

* cited by examiner

HYDROGEN PRODUCTION CATALYSTS AND ASSOCIATED SYSTEMS AND METHODS

RELATED APPLICATION

This application claims priority to U.S. Provisional Application No. 61/714,561, filed Oct. 16, 2012 which is incorporated herein by reference.

BACKGROUND

Hydrogen is generally considered a "clean fuel" because it can be reacted with oxygen in hydrogen-consuming devices, such as a fuel cells or combustion engines, to produce energy and water. Virtually no other reaction byproducts are produced in exhaust from these systems. As a result, the use of hydrogen as a fuel effectively solves many environmental problems associated with the use of petroleum based fuels.

As is well known, various industrial methods are practiced for the generation of hydrogen gas in an industrially feasible scale including the method of electrolysis of water, reaction of a metal with an acid, reaction of certain metals with a strongly alkaline compound, reaction of calcium hydride with water, steam reforming of methyl alcohol or methane in natural gas, releasing of hydrogen gas from a hydrogen-loaded hydrogen-absorbing metal or alloy, and so on.

However, existing hydrogen-generating approaches can have drawbacks including high costs, low yields, slow production, poor stability, etc. As such, various challenges remain in terms of providing hydrogen cost effectively and in an efficient manner.

SUMMARY

The present disclosure provides compositions, methods, and systems directed to catalysts for hydrogen production. In one embodiment, an alkaline catalyst for hydrogen generation can include a first metal, a second metal, and hydroxide. When the alkaline catalyst is added to an aqueous solution containing a hydrogen generation metal, the aqueous solution produces at least 4 L of hydrogen per 5 grams of hydrogen generation metal per 15 minutes at a production temperature of 140° F. and a pressure of 1 atm.

In another embodiment, a method of producing hydrogen can comprise adding an alkaline catalyst to an aqueous solution containing a hydrogen generation metal, wherein the aqueous solution produces at least 4 L of hydrogen per 5 gram of hydrogen generation metal per 15 minutes at a production temperature of 140° F. and at a pressure of 1 atm.

Additionally, a method of manufacturing an alkaline catalyst for generating hydrogen can comprise adding a first metal hydroxide to an aqueous solution. The method can further include adding a second metal hydroxide to the aqueous solution and mixing the aqueous solution. The aqueous solution can also be subjected to a magnetic field of at least 5,000 gauss during mixing. The aqueous solution can then be dried to form a solid alkaline catalyst.

Alternately, a method of manufacturing an alkaline catalyst for hydrogen generation can include adding a first metal hydroxide to an aqueous solution, adding a second metal hydroxide to the aqueous solution, and mixing the aqueous solution to form the alkaline catalyst.

Further, a system for hydrogen generation can comprise an aqueous solution, a hydrogen generation metal, and an alkaline catalyst. As discussed above, when the alkaline catalyst is added to the aqueous solution containing the hydrogen generation metal, the aqueous solution can produce at least 4 L of hydrogen per 5 gram of hydrogen generation metal per 15 minutes at a production temperature of 140° F. and at a pressure of 1 atm.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

Figure 1:
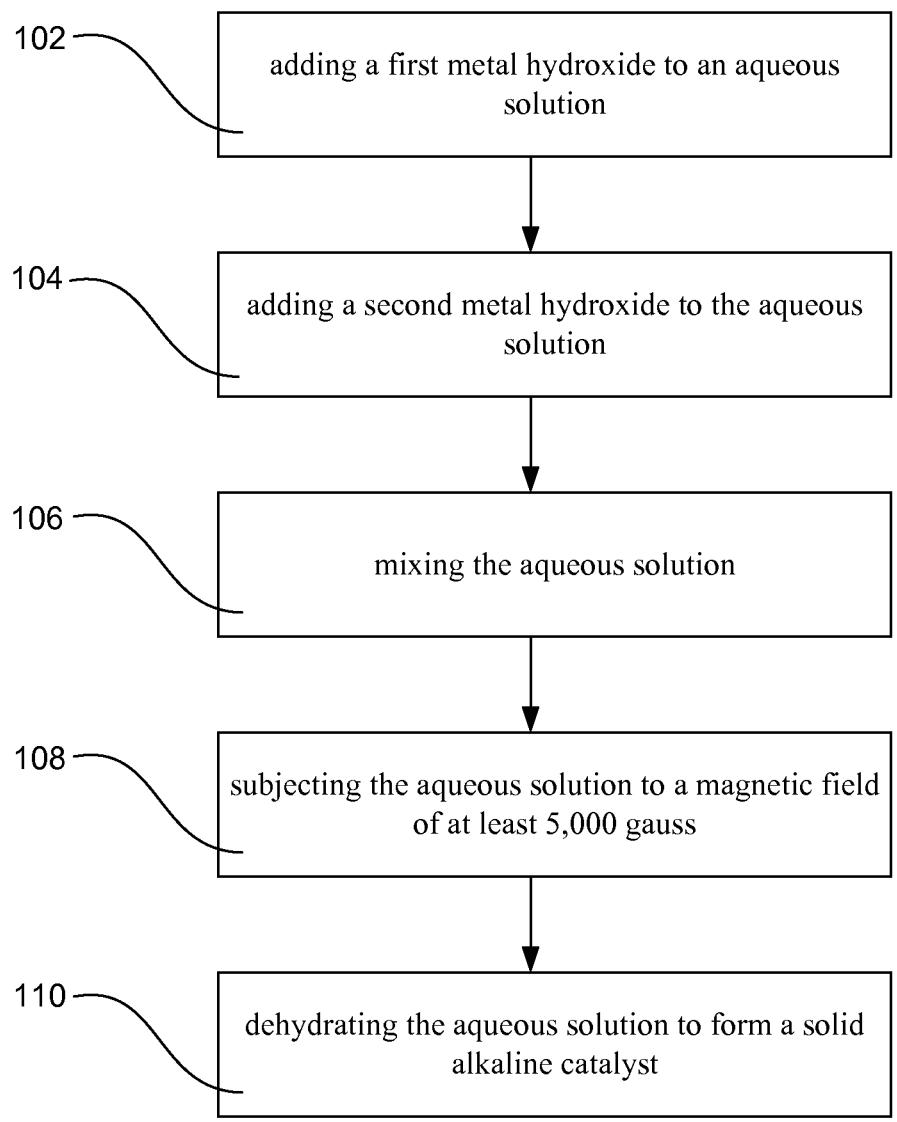
FIG. 1 is a flow chart of a method in accordance with one embodiment of the present invention.

It should be noted that the figures are merely exemplary of several embodiments of the present invention and no limitations on the scope of the present invention are intended thereby. Further, the figures are generally not drawn to scale, but are drafted for purposes of convenience and clarity in illustrating various aspects of the invention.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

Definitions

In describing and claiming the present invention, the following terminology will be used. The singular forms "a," "an," and "the" include plural references unless the context clearly dictates otherwise. Thus, for example, reference to "a catalyst" includes reference to one or more of such catalysts, "a first metal hydroxide" includes reference to one or more of such materials, and "a heating step" refers to one or more of such steps.

As used herein, "about" refers to a degree of deviation based on experimental error typical for the particular property identified. The latitude provided the term "about" will depend on the specific context and particular property and can be readily discerned by those skilled in the art. The term "about" is not intended to either expand or limit the degree of equivalents which may otherwise be afforded a particular value. Further, unless otherwise stated, the term "about" shall expressly include "exactly," consistent with the discussion below regarding ranges and numerical data.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a range of about 1 to about 200 should be interpreted to include not only the explicitly recited limits of 1 and about 200, but also to include individual sizes such as 2, 3, 4, and sub-ranges such as 10 to 50, 20 to 100, etc.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

Hydrogen Generation Catalysts

The present disclosure provides catalysts that provide for a hydrogen production previously unachieved. Specifically, the present inventor has discovered the use of metal hydroxides that can be combined to provide excellent hydrogen generation when exposed to a hydrogen generation metal in an aqueous solution. Without intending to be bound by any particular theory, the use of a magnetic field in the production of the catalysts can allow for improved hydrogen generation rates and substantially longer production life of the catalysts. However, even without the use of a magnetic field, the present catalysts can provide significant hydrogen production.

In one embodiment, an alkaline catalyst for hydrogen generation can comprise a first metal, a second metal, and hydroxide. Additionally, when the alkaline catalyst is added to an aqueous solution containing a hydrogen generation metal, the aqueous solution can produce at least 4 L of hydrogen per 5 gram of hydrogen generation metal per 15 minutes at a production temperature of 140° F. and at a pressure of 1 atm. In some aspects, the aqueous solution produces at least 5 L of hydrogen per 5 gram of hydrogen generation metal, at least 6 L of hydrogen per 5 grams of hydrogen generation metal, or even at least 7 L of hydrogen per 5 gram of hydrogen generation metal. In another aspect, the aqueous solution produces at least 8 L of hydrogen per 5 gram of hydrogen generation metal. In still another aspect, the aqueous solution produces at least 11 L of hydrogen per 5 gram of hydrogen generation metal. Specific hydrogen production rates can vary slightly depending on the specific alkaline catalyst composition and corresponding hydrogen production metal.

The alkaline catalyst can be produced by mixing a first metal hydroxide with a second metal hydroxide in solution forming a hydroxide mixture, wherein the alkaline catalyst comprises at least the first metal, the second metal, and the hydroxide. The mixture can be used directly or reduced to a solid catalyst as discussed herein. The catalyst can be used to produce about 4 L of hydrogen in a period of 0.2 hours. In one aspect, the catalyst can be used to produce about 778 L of hydrogen in a period of 1 hour.

Additionally, the catalyst can be produced by mixing a first metal hydroxide with a second metal hydroxide in solution forming a hydroxide mixture, and subjecting the hydroxide mixture to a magnetic field of at least 5,000 gauss. The magnetic field can be applied during at least a portion of the mixing step. Although mixing times can vary, typically mixing times from about 30 seconds to about 30 minutes is sufficient to form the alkaline catalyst. Similarly, the magnetic field can be applied at least during initial mixing. Generally, the magnetic field can be applied for at least 60 seconds and in some cases up to about 240 minutes. A suitable magnetic field can be applied using any magnetic field generator and can be sustained using electromagnets and/or permanent magnets.

In some cases, the hydroxide mixture can be heated during formation of the alkaline catalyst. For example, the hydroxide mixture can be heated to a mixing temperature from about 21° C. to about 98° C. Heating can also be accomplished by preheating constituent components (i.e. first metal hydroxide and/or second metal hydroxide). Additionally, the catalyst can be prepared as a solid catalyst by drying or dehydrating the hydroxide mixture to form the alkaline catalyst. Further discussion of methods of manufacturing the catalyst is disclosed hereafter. Generally, the alkaline catalyst comprises at least the first metal, the second metal, and the hydroxide.

Regarding the metal hydroxides, the present catalysts generally comprise at least two such metal hydroxides. In one embodiment, the first metal hydroxide and the second metal hydroxide can be independently selected from the group consisting of: potassium hydroxide, sodium hydroxide, calcium hydroxide, magnesium hydroxide, lithium hydroxide, strontium hydroxide, and thorium hydroxide. In one aspect, the first metal hydroxide can be potassium hydroxide and the second metal hydroxide can be sodium hydroxide. As discussed herein, such metal hydroxides are combined to form a catalyst that provides excellent hydrogen production when exposed to a hydrogen generation metal in an aqueous solution.

While not being bound by any particular theory, it is thought that the metal hydroxides combine to a stable structure that allows for the removal of oxide layers on the hydrogen generation metal allowing for exposure of unoxidized metal atoms on the surface of the metal to react with water to form hydrogen gas. As such, the catalyst is thought to contain at least a first metal, a second metal, and a hydroxide, although such structure is not intended to be limiting. In one embodiment, the first metal and the second metal can be metal ions independently selected from the group consisting of: potassium, sodium, calcium, iron, magnesium, lithium, strontium, and thorium. In another embodiment, the first metal and the second metal can be present in the alkaline catalyst in a molar ratio ranging from 1:8 to 8:1. In some aspects, the molar ratio can be 1:5 to 5:1, or 1:3 to 3:1, or even 1:2 to 2:1. In one specific example, the first metal can be sodium hydroxide and the second metal can be potassium hydroxide, which are present in the catalyst in a molar ratio of 2:1.

The alkaline catalyst can be used in a variety of applications by exposing the alkaline catalyst in an aqueous environment to a hydrogen generation metal. Generally, the hydrogen generation metal can be any metal that is capable of reacting with water in an alkaline environment to form hydrogen. Typically, such reaction also forms a metal oxide layer on the hydrogen generation metal. As such, in one embodiment, after addition of the alkaline catalyst, the aqueous solution has a pH from 8 to 14. In one embodiment, the hydrogen generation metal can be selected from the group of aluminum, magnesium, chromium, iron, cobalt, nickel, tin, lead, and alloys thereof, and mixtures thereof. In one aspect, the hydrogen generation metal can be aluminum. In another aspect, the hydrogen generation metal can be magnesium. In still another aspect, the hydrogen generation metal can be zinc.

The present catalysts can be matched to particular hydrogen generation metals to provide combinations having different levels of hydrogen production. For example, the present catalyst can be manufactured from potassium hydroxide and sodium hydroxide paired with aluminum to form hydrogen at a rate of about 8 L per 5 grams of aluminum in about 3 minutes at a temperature of about 240° F. in a closed system. Such a combination may provide significant cost savings over other catalyst/metal combinations. For example, the present catalyst can be manufactured from lithium hydroxide and sodium hydroxide paired with magnesium to form hydrogen at a rate of about 11 L per 5 grams of magnesium in about 3 minutes at a temperature of about 240° F. in a closed system. While the rate of hydrogen production is significantly higher, the cost of the materials may also be significantly higher. Other non-limiting examples of catalyst and production metal combinations can include the catalyst and zinc or any other metal included here-in. As such each combination may provide particular advantages. In one embodiment, the catalyst/metal combination can be configured for a one-time use application. Additionally, the present catalysts may be recovered and recycled for repeated use.

In addition to the compositions, the present disclosure provides methods of producing hydrogen as well as the manufacturing of the catalysts disclosed herein. In one embodiment, a method of producing hydrogen can comprise adding an alkaline catalyst to an aqueous solution containing a hydrogen generation metal. Generally, as discussed herein, the aqueous solution can produce at least 4 L of hydrogen per 5 gram of hydrogen generation metal per 15 minutes at a production temperature of 140° F. and at a pressure of 1 atm. In one embodiment, the method can further comprise initially heating the aqueous solution to a temperature of at least 120° F. at which point heating is no longer provided during production of hydrogen. Notably, the present process is exothermic and generates heat. As such, in one embodiment, the aqueous solution reacts with the hydrogen generation metal in the presence of the alkaline catalyst to produce hydrogen and heat. Non-limiting examples of applications can include fuel cells, turbine generators, camp stove fuel, and the like.

In one aspect, the method can further comprise maintaining the production temperature by at least partially removing the heat. Removal of the heat can be accomplished by various processes such that the heat is dissipated or captured for use in other processes. In one aspect, removal of heat can be accomplished by a heat exchanger. Such recovered heat can be vented or utilized to generate electricity or other process (e.g. heating gases to drive a turbine).

Generally, the alkaline catalyst can be added to the solution in various amounts based on the desired amount of hydrogen production. In one embodiment, the alkaline catalyst can be added in an amount ranging from about 10 g to about 150 g per liter of aqueous solution.

Turning now to FIG. 1, A method 100 of manufacturing an alkaline catalyst for generating hydrogen can comprise adding a first metal hydroxide to an aqueous solution 102; adding a second metal hydroxide to the aqueous solution 104; mixing the aqueous solution 106; and subjecting the aqueous solution to a magnetic field of at least 5,000 gauss 108. The method can further comprise dehydrating the aqueous solution to form a solid alkaline catalyst 110. The method can further comprise heating the aqueous solution. In one aspect, the heating can be to a temperature ranging from about 160° F. to about 210° F. for a period of time ranging from about 10 minutes to about 4 hours. The method can further comprise transferring the aqueous solution to a glove box with an inert environment prior to dehydrating.

The metal hydroxides can be added to provide various molar ratios as discussed herein and may depend upon the specific metal hydroxides used. In one embodiment, the first metal hydroxide can be added in an amount ranging from about 10 g to about 150 g per liter of solution. In another embodiment, the second metal hydroxide can be added in an amount ranging from about 10 g to about 150 g per liter of solution.

The present steps can be added in various orders and is not limited to the order recited. For example, the second metal hydroxide may be added to the aqueous solution prior to the first metal hydroxide. In one embodiment, the mixing can be performed simultaneous as adding the first metal hydroxide, adding the second metal hydroxide, or during both adding steps. Additionally, subjecting the aqueous solution to a magnetic field can be for a period of time ranging from about 10 minutes to about 4 hours.

Figure 2:
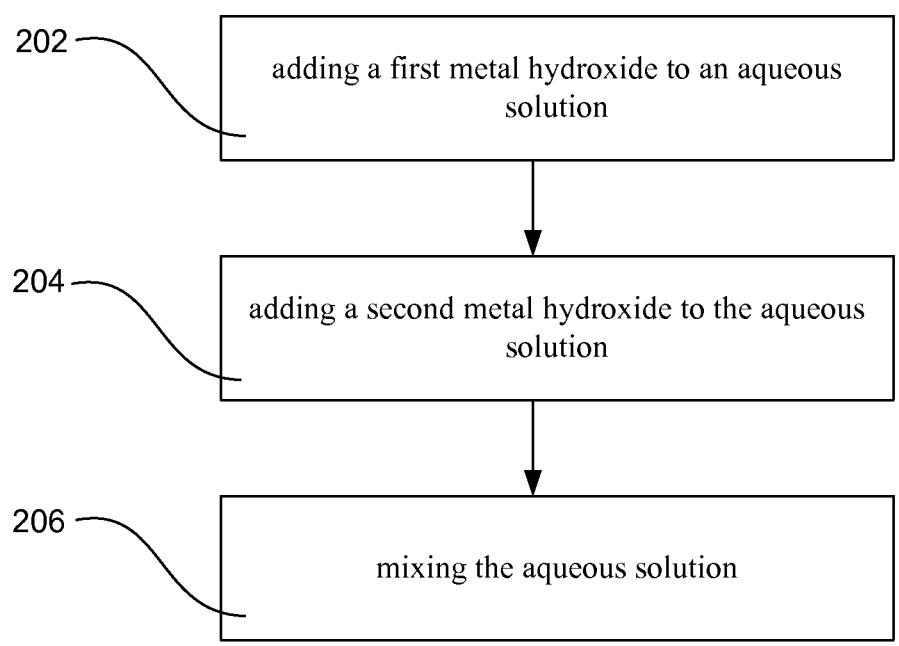
FIG. 2 is a flow chart of a method in accordance with one embodiment of the present invention.

Turning now to FIG. 2, a method of manufacturing an alkaline catalyst for hydrogen generation 200 can comprise adding a first metal hydroxide to an aqueous solution 202; adding a second metal hydroxide to the aqueous solution 204; and mixing the aqueous solution 206. As discussed herein, the method can further comprise heating the aqueous solution and heating to a temperature ranging from about 160° F. to about 210° F. for a period of time ranging from about 10 minutes to about 4 hours. As discussed herein, the present catalysts can be used as a liquid or the process can further comprise dehydrating the aqueous solution to form a solid alkaline catalyst. In one aspect, the method can further comprise transferring the aqueous solution to a glove box with an inert environment prior to dehydrating.

In addition to the present catalyst compositions and methods, a system for hydrogen generation can comprise an aqueous solution, a hydrogen generation metal, and an alkaline catalyst, including any of those described herein.

EXAMPLES

The following examples illustrate some embodiments of the present compositions, methods, and systems that are presently known. However, it is to be understood that the following are only exemplary or illustrative of the application of the principles of the present compositions, methods, and systems. Numerous modifications and alternative compositions, methods, and systems may be devised by those skilled in the art without departing from the spirit and scope of the present compositions, methods, and systems. The appended claims are intended to cover such modifications and arrangements. Thus, while the compositions, methods, and systems have been described above with particularity, the following examples provide further detail in connection with what are presently deemed to be the acceptable embodiments.

Example 1—Manufacturing of Hydrogen Production Catalyst (NaOH/KOH)

A catalyst was prepared by mixing 100 g of KOH and 200 g of NaOH in 500 ml of water in a vessel. The mixture was heated to 98° F. for 240 minutes. This was then used to generate hydrogen.

Example 2—Manufacturing of Hydrogen Production Catalyst (NaOH/KOH) Magnetic

FIELD

A catalyst was prepared by mixing 100 g of KOH and 200 g of NaOH in 500 ml of water in a vessel. The mixture was heated to 98° F. for 240 minutes. The mixture was then subjected to a magnetic field of about 5000 gauss for 240 minutes. The mixture was then dehydrated by evaporating the water. 300 g of catalyst was obtained.

Example 3—Comparative Catalyst

A study of various catalysts was reported by DOE in "Reaction of Aluminum with Water to Produce Hydrogen: A Study of Issues Related to the Use of Aluminum for On-Board Vehicular Hydrogen Storage" authored by John Petrovic and George Thomas, consultants to the DOE Hydrogen Program (2008), which is incorporated by reference in its entirety, provides for a hydrogen production of: $2 \times 10^{-4}$ g H2/sec/g of Al using KCl and NaCl salts as promoters at 55° C.

Example 4—Comparative Catalyst (KOH)

An article entitled "Hydrogen Generation From Aluminum In A Non-Consumable Potassium Hydroxide Solution" by L. Soler, J. Macanás, M. Muñoz and J. Casado in Proceedings International Hydrogen Energy Congress and Exhibition IHEC 2005 Istanbul, Turkey, 13-15 Jul. 2005, which is incorporated by reference in its entirety, provides a catalyst consisting of KOH. "The best results were achieved for a 5 M KOH solution at 75° C. In these conditions, 0.1 g of Al were consumed in just 0.5 minutes. As a consequence, the average $H_2$ evolution rate reached ca. 260 mL/min in this case." Page 4.

Example 5—Hydrogen Production

Various amounts of the catalyst from Example 2 was used to produce hydrogen by placing the catalyst in 500 ml with various amounts of aluminum metal according to the amounts/conditions set forth in Table 1. Individual amounts of hydrogen per minute are further reported in Tables 2-7.

TABLE 1

| System # | Catalyst Amount (g) | Al (g) | Temp Initial (° F.) | Temp Final (° F.) | pH Initial | pH Final | Total $H_2$ (L) |
|---|---|---|---|---|---|---|---|
| 1 | 20 | 5 | 66 | 86 | 13.69 | 13.71 | 2.09 |
| 2 | 25 | 5 | 66 | 94 | 13.68 | 13.35 | 7.60 |
| 3 | 30 | 5 | 66 | 92 | 13.82 | 13.76 | 6.82 |

TABLE 1-continued

| System # | Catalyst Amount (g) | Al (g) | Temp Initial (° F.) | Temp Final (° F.) | pH Initial | pH Final | Total $H_2$ (L) |
|---|---|---|---|---|---|---|---|
| 4 | 35 | 5 | 66 | 115 | 13.71 | 13.66 | 8.09 |
| 5 | 40 | 5 | 66 | 116 | 13.78 | — | 8.09 |
| 6 | 50 | 5 | 66 | 120 | 13.91 | — | 8.33 |
| 7 | 45 | 5 | 66 | — | 13.77 | — | 8.05 |

TABLE 2

| $H_2$ (L) | Production Time for System #1 (minutes) |
|---|---|
| 0 | 3 |
| 0.35 | 5 |
| 0.90 | 7 |
| 2.09 | 10 |

TABLE 3

| $H_2$ (L) | Production Time for System #2 (minutes) |
|---|---|
| 0.31 | 3 |
| 1.67 | 5 |
| 4.41 | 7 |
| 7.60 | 10 |

TABLE 4

| $H_2$ (L) | Production Time for System #3 (minutes) |
|---|---|
| 1.11 | 3 |
| 4.06 | 5 |
| 6.77 | 7 |
| 6.82 | 10 |

TABLE 5

| $H_2$ (L) | Production Time for System #4 (minutes) |
|---|---|
| 5.19 | 3 |
| 8.09 | 5 |
| 8.09 | 7 |
| 8.09 | 10 |

TABLE 6

| $H_2$ (L) | Production Time for System #5 (minutes) |
|---|---|
| 8.09 | 3 |
| 8.09 | 5 |
| 8.09 | 7 |
| 8.09 | 10 |

TABLE 7

| $H_2$ (L) | Production Time for System #6 (minutes) |
|---|---|
| 0.12 | 0.5 |
| 1.16 | 1 |
| 3.63 | 1.5 |
| 6.51 | 2 |
| 8.33 | 2.4 |

TABLE 8

| $H_2$ (L) | Production Time for System #7 (minutes) |
|---|---|
| 4.53 | 3 |
| 8.05 | 5 |
| 8.05 | 7 |
| 8.05 | 10 |

Example 6—Manufacturing of Hydrogen Production Catalyst (LiOH/KOH) Magnetic Field A catalyst is prepared by mixing 100 g of LiOH and 200 g of NaOH in 500 ml of water in a vessel. The mixture is heated to 98° F. for 240 minutes. The mixture is then subjected to a magnetic field of about 5000 gauss for 240 minutes. The mixture is then dehydrated by evaporating the water. 300 g of catalyst is obtained. The expected yield of hydrogen production per 5 grams of magnesium at a production temperature of 240 over 3 minutes is 14.3 L The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:

1. A method of producing hydrogen, comprising adding an alkaline catalyst to an aqueous solution containing a hydrogen generation metal, wherein the aqueous solution produces at least 4 L of hydrogen per 5 gram of hydrogen generation metal per 15 minutes at a production temperature of 140° F. and at a pressure of 1 atm, and wherein the alkaline catalyst is produced by mixing a first metal hydroxide with a second metal hydroxide in solution forming a hydroxide mixture, wherein the alkaline catalyst comprises at least the first metal, the second metal, and the hydroxide.

2. The method of claim 1, further comprising initially heating the aqueous solution to a temperature of at least 120° F. at which point heating is no longer provided during production of hydrogen.

3. The method of claim 1, wherein the first metal hydroxide and the second metal hydroxide are independently selected from the group consisting of: potassium hydroxide, sodium hydroxide, calcium hydroxide, magnesium hydroxide, lithium hydroxide, strontium hydroxide, and thorium hydroxide.

4. The method of claim 1, further comprising subjecting the hydroxide mixture to a magnetic field of at least 5,000 gauss, heating the hydroxide mixture, and dehydrating the hydroxide mixture to form the alkaline catalyst.

5. The method of claim 1, wherein the hydrogen generation metal is selected from the group of aluminum, magnesium, chromium, iron, cobalt, nickel, tin, lead, and alloys thereof, and mixtures thereof.

6. The method of claim 1, wherein the hydrogen generation metal is aluminum.

7. The method of claim 1, wherein the aqueous solution produces at least 8 L of hydrogen per 5 gram of hydrogen generation metal.

8. The method of claim 1, wherein the first metal hydroxide is potassium hydroxide and the second metal hydroxide is sodium hydroxide.

9. The method of claim 1, wherein the first metal and the second metal are present in the alkaline catalyst in a molar ratio ranging from 1:8 to 8:1.

10. The method of claim 1, wherein the aqueous solution is an alkaline solution having a pH from 8 to 14.

* * * * *